US012539806B2

(12) United States Patent
Mock

(10) Patent No.: US 12,539,806 B2
(45) Date of Patent: Feb. 3, 2026

(54) METHODS, DEVICES, AND SYSTEMS FOR HEADLIGHT ILLUMINATION FOR SEMI-AUTONOMOUS VEHICLES

(71) Applicant: Event Capture Systems, Inc., Mint Hill, NC (US)

(72) Inventor: Brian James Mock, Mint Hill, NC (US)

(73) Assignee: Event Capture Systems, Inc., Mint Hill, NC (US)

( * ) Notice: Subject to any disclaimer, the term of this patent is extended or adjusted under 35 U.S.C. 154(b) by 0 days.

(21) Appl. No.: 18/222,748

(22) Filed: Jul. 17, 2023

(65) Prior Publication Data

US 2023/0356650 A1  Nov. 9, 2023

Related U.S. Application Data

(63) Continuation of application No. 17/556,138, filed on Dec. 20, 2021, now Pat. No. 11,712,992, which is a
(Continued)

(51) Int. Cl.
*B60Q 1/14* (2006.01)
*B60Q 1/00* (2006.01)
(Continued)

(52) U.S. Cl.
CPC ........... *B60Q 1/143* (2013.01); *B60Q 1/0023* (2013.01); *H05B 45/10* (2020.01); *H05B 47/11* (2020.01)

(58) Field of Classification Search
CPC ....... B60Q 1/0023; B60Q 1/143; G01J 1/028; G01J 1/4228; G01J 2003/2813; H05B 45/10; H05B 47/11; Y02B 20/40
See application file for complete search history.

(56) References Cited

U.S. PATENT DOCUMENTS 11,712,992 B2 * 8/2023 Mock .................... G01J 1/0228
315/82
2012/0062746 A1 * 3/2012 Otsuka ................... G08G 1/166
348/148
(Continued)

FOREIGN PATENT DOCUMENTS

EP        2957825 B1    10/2018

OTHER PUBLICATIONS

ISA/RU, International Search Report and Written Opinion for corresponding PCT Patent Application No. PCT/US2020/039364, mailed Sep. 10, 2020, 7 pages.
(Continued)

*Primary Examiner* — Raymond R Chai
(74) *Attorney, Agent, or Firm* — NK Patent Law

(57) ABSTRACT

Disclosed herein are methods, systems, and devices for providing optimized simultaneous illumination for human vision and machine based navigation vision on a semi-autonomous vehicle. In one embodiment, a system includes a first control output configured to provide first illumination control information including first active cycle times for a first illumination source. The first illumination source is configured to provide a first frequency band of illumination for machine vision navigation of the semi-autonomous vehicle. The system further includes a second control output configured to provide second illumination control information including second active cycle times for a second illumination source. The second illumination source is configured to provide a second frequency band of illumination for a human driver of the semi-autonomous vehicle. The system further includes a first monitor input configured to receive ambient illumination information from a camera system.

20 Claims, 4 Drawing Sheets

Related U.S. Application Data continuation of application No. PCT/US2020/039364, filed on Jun. 24, 2020.

(60) Provisional application No. 62/865,546, filed on Jun. 24, 2019.

(51) Int. Cl.
  *H05B 45/10* (2020.01)
  *H05B 47/11* (2020.01)

(56) References Cited

U.S. PATENT DOCUMENTS

| | | | | |
|---|---|---|---|---|
| 2013/0327964 A1* | 12/2013 | Otsuka | ............... | F21S 41/265 250/504 R |
| 2015/0137680 A1* | 5/2015 | Komatsu | ............ | B60Q 1/0023 315/82 |
| 2015/0145418 A1* | 5/2015 | Pope | ................... | H05B 47/199 315/149 |
| 2015/0168954 A1* | 6/2015 | Hickerson | .............. | G01S 17/04 901/1 |
| 2015/0296200 A1 | 10/2015 | Grauer et al. | | |
| 2016/0381354 A1 | 12/2016 | Jamieson et al. | | |
| 2017/0064278 A1 | 3/2017 | Posselius et al. | | |
| 2019/0158765 A1* | 5/2019 | Kuybeda | .............. | G01J 5/0806 |
| 2019/0220025 A1* | 7/2019 | Chen | .................... | G05D 1/617 |
| 2021/0039549 A1* | 2/2021 | Ramesh Ahuja | ...... | B60Q 1/143 |

OTHER PUBLICATIONS

WIPO, International Preliminary Report on Patentability for corresponding PCT Patent Application No. PCT/US2020/039364, dated Dec. 28, 2021, 5 pages.

* cited by examiner

METHODS, DEVICES, AND SYSTEMS FOR HEADLIGHT ILLUMINATION FOR SEMI-AUTONOMOUS VEHICLES

PRIORITY CLAIM

This application is a continuation of U.S. application Ser. No. 17/556,138 entitled "METHODS, DEVICES, AND SYSTEMS FOR HEADLIGHT ILLUMINATION FOR SEMI-AUTONOMOUS VEHICLES", which was filed on Dec. 20, 2021, which is a continuation of International Patent Application No. PCT/US2020/039364 entitled "METHODS, DEVICES, AND SYSTEMS FOR HEADLIGHT ILLUMINATION FOR SEMI-AUTONOMOUS VEHICLES", filed on Jun. 24, 2020, which claims the benefit of U.S. Provisional Patent Application No. 62/865,546 entitled "METHODS, DEVICES, AND SYSTEMS FOR HEADLIGHT ILLUMINATION FOR SEMI-AUTONOMOUS VEHICLES", which was filed on Jun. 24, 2019, the entire contents of all are incorporated herein by reference.

TECHNICAL FIELD

The present invention relates generally to semi-autonomous vehicles, and more specifically, to illumination for machine vision and human vision for semi-autonomous vehicles.

BACKGROUND

Complex camera systems are currently being deployed on semi-autonomous vehicles to provide vehicle navigation and obstacle avoidance support for drivers of the vehicles. The associated cameras with these systems must provide quality resolution with adequate frame rates to be practical. Light sources (e.g. headlights) can allow the cameras to operate at optimum parameters (e.g. shutter speed/exposure, depth of field, contrast and dynamic range) and provide illumination for drivers while visibility is clear. However, weather can have a detrimental effect on these systems. For example rain, sleet, snow, and fog can block the ability of these cameras to detect obstacles or the weather may appear as one or more obstacles. Infrared (IR) light can be effective in providing the correct illumination for the cameras to detect obstacles in weather and allow the cameras to operate at optimum parameters while detecting obstacles. However, the IR lighting does not provide adequate lighting for the driver of the semi-autonomous vehicle. Adding additional broad-spectrum lighting for the driver in the same location as IR lighting renders the effectiveness of the IR lighting useless. Also, approaching vehicle headlights and/or street lights may render IR lighting useless as well.

Accordingly, a need exists for devices, systems and methods for providing optimized simultaneous illumination for human vision and machine based navigation vision on semi-autonomous vehicles.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are methods, systems, and devices for solving the problem of providing optimized simultaneous illumination for human vision and machine based navigation vision on a semi-autonomous vehicle. In one embodiment, a system includes a first control output configured to provide first illumination control information including first active cycle times for a first illumination source. The first illumination source is configured to provide a first frequency band of illumination for machine vision navigation of the semi-autonomous vehicle. The system further includes a second control output configured to provide second illumination control information including second active cycle times for a second illumination source. The second illumination source is configured to provide a second frequency band of illumination for a human driver of the semi-autonomous vehicle. The system further includes a first monitor input configured to receive ambient illumination information from a camera system. The ambient illumination information is based on non-illumination cycle times. The non-illumination cycle times, the first active cycles times, and the second active cycle times are mutually exclusive. The ambient illumination information indicates a probability of effectiveness of the first illumination source.

In some embodiments, the first illumination source and the second illumination source may be housed within a standardized vehicle headlight assembly. The camera system may also be housed within the standardized vehicle headlight assembly. The first illumination source may be further configured to provide a first lumen level between 3500 lumens and 7500 lumens. The second illumination source may be further configured to provide a second lumen level between 3500 lumens and 7500 lumens.

In some embodiments, the system may further include a first computing device. The first computing device may be configured to provide the first control output, the second control output, and the first monitor input. The first computing device may also be housed within the standardized vehicle headlight assembly. The first computing device may be configured to receive synchronization information from a vehicle management system. The non-illumination cycle times, the first active cycles times, and the second active cycle times may be based on the synchronization information.

In some embodiments, the first frequency band of illumination and the second frequency band of illumination may be mutually exclusive. In certain embodiments, the first frequency band of illumination may be centered in a range between 820 nanometers and 880 nanometers and the second frequency band of illumination may be centered in a range between 380 nanometers and 740 nanometers.

In some embodiments, the first illumination control output may be further configured to provide first intensity level information for the first source and the second control output may be further configured to provide second intensity level information for the second illumination source. The first control output may be a first controlled current source and the second control output may be a second controlled current source. In other embodiments, the first control output may be a first controlled voltage source and the second control output may be a second controlled voltage source. The first illumination source may include a first light-emitting-diode (LED) array and the second illumination source may include a second LED array.

In some embodiments, the system may also include a first camera control output configured to provide first camera timing information to the camera system. The first camera timing information may include a first camera frame rate and a first camera per frame exposure time. The first camera frame rate may be approximately 24 frames per second (fps), 30 fps, 60 fps, or 120 fps. The first camera per frame exposure time may be between 100 microseconds and 300 microseconds. In other embodiments, the first camera per frame exposure time may be less than 100 microseconds. In still other embodiments, the first camera per frame exposure time may be greater than 300 microseconds. The first illumination source may be further configured to provide the first frequency band of illumination during active exposure intervals of the camera system and the second illumination source may be further configured to provide the second frequency band of illumination during non-active exposure intervals of the camera system. The first control output may be further configured to vary the first frequency band of illumination. The second control output is further configured to vary the second frequency band of illumination.

In some embodiments, the system may also include a camera interface configured to receive a plurality of images from the camera system and the system may be further configured to do derive the ambient illumination information from the plurality of images.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

In general, this disclosure relates to semi-autonomous vehicles and improved methods for simultaneous illumination supporting machine vision (e.g. autonomous navigation) and human vision (e.g. vehicle driver) within the semi-autonomous vehicles.

Figure 1:
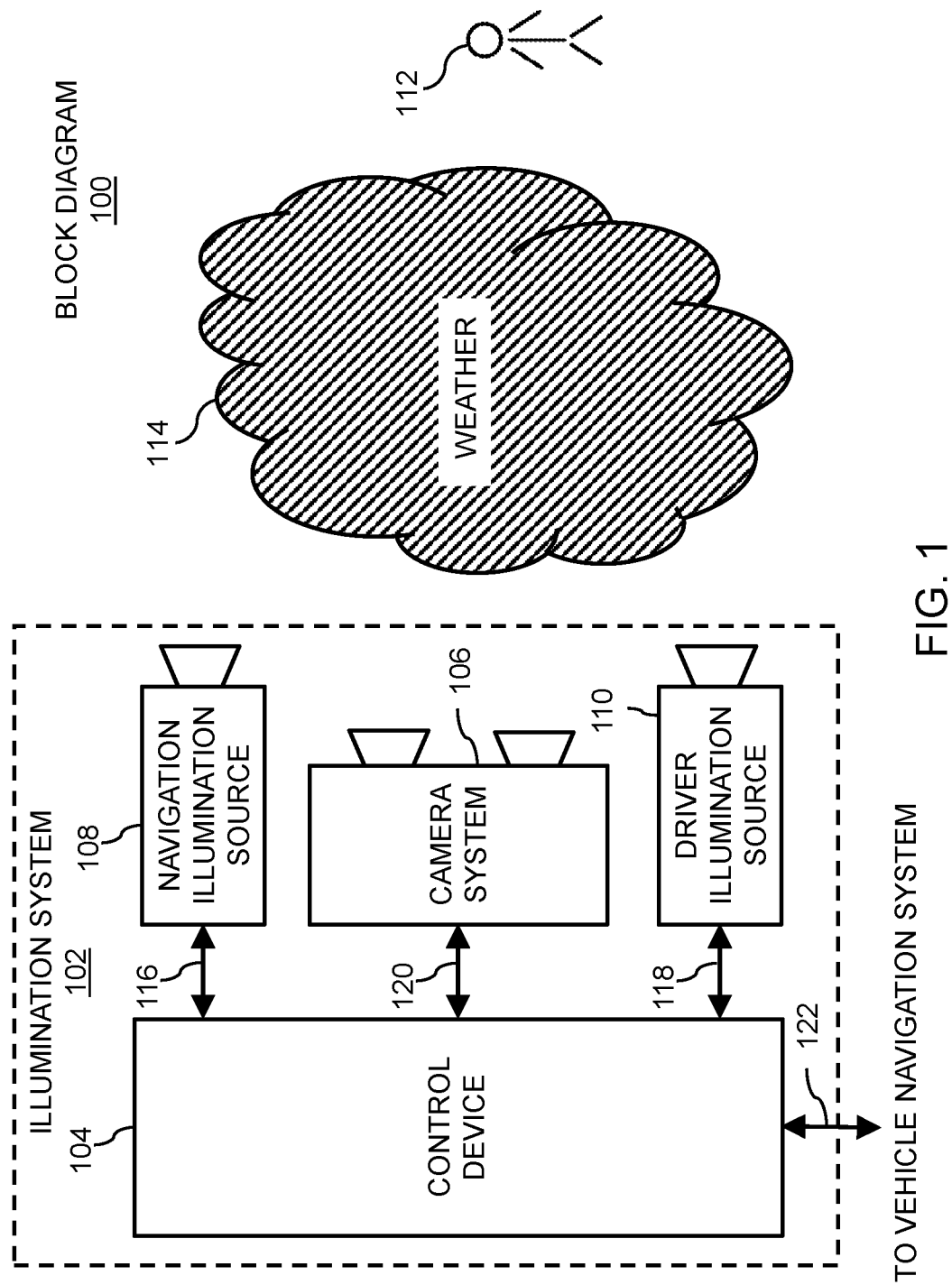
FIG. 1 depicts a block diagram illustrating an illumination system for providing optimized simultaneous illumination for human vision and machine based navigation vision on a semi-autonomous vehicle in accordance with embodiments of the present disclosure.

FIG. 1 depicts a block diagram 100 illustrating an illumination system 102 configured for providing optimized simultaneous illumination for human vision and machine based navigation vision on a semi-autonomous vehicle in accordance with embodiments of the present disclosure. The illumination system 102 may be incorporated with any type of semi-autonomous vehicle such as an automobile, truck, motorcycle, van, boat, plane, helicopter, or the like. The illumination system 102 includes a control device 104, a camera system 106, a navigation illumination source 108, and a driver illumination source 110. The illumination system 102 is configured to provide illumination such that the camera system 108 can detect obstacles such as a pedestrian 112 through weather 114. The weather 114 may be rain, fog, sleet, snow, hail, smoke, smog, and/or some combination thereof. Other obstacles may include other vehicles, road signs, animals, or the like.

The navigation illumination source 108 may include an infrared (IR) light emitting diode (LED) array. The navigation illumination source 108 may have a maximum intensity level between 3500 lumens and 7500 lumens. Additionally, the navigation illumination source 108 may have a frequency band of illumination centered in a range between 820 nanometers and 880 nanometers and optimized to penetrate weather to detect obstacles. The driver illumination source 108 may include a white LED array. The driver illumination source 110 may also have a maximum intensity level between 3500 lumens and 7500 lumens. A frequency band of illumination for the driver illumination source 110 may be centered in a range between 380 nanometers and 740 nanometers and optimized for human vision.

The control device 104 is coupled with the navigation illumination source 108 via a status/control interface 116. The control device 104 provides navigation illumination control information via the status/control interface 116 to the navigation illumination source 108 for machine vision for the camera system 106. The navigation illumination control information includes active cycle times for when the navigation illumination source 108 is on. The navigation illumination control information may also include intensity level information and/or frequency band information. The control device 104 may also receive status information including failures from the navigation illumination source 108 via the status/control interface 116.

The control device 104 is coupled with the driver illumination source 110 via another status/control interface 118. The control device 104 provides driver illumination control information via the status/control interface 118 to the driver illumination source 110 for driver vision. The driver illumination control information includes active cycle times for when the driver illumination source 110 is on. The driver illumination control information may also include intensity level information and/or frequency band information. The control device 104 may also receive status information including failures from the driver illumination source 110 via the status/control interface 118.

The control device 104 is coupled with the camera system via another status/control interface 120. The control device 104 provides camera timing information via the status/control interface 118 to the camera system 106. One or more cameras of the camera system 106 may each include a charge-coupled device (CCD) that acts as an image sensor for capturing high resolution images for the navigation function. In other embodiments, each camera of the camera system 106 may include a complementary metal-oxide-semiconductor (CMOS) sensor or an N-type metal-oxide-semiconductor (NMOS) sensor for capturing the high resolution images. The camera timing information may include camera frame rate and a camera per frame exposure time for one or more cameras of the camera system 106. The camera frame rate may be approximately 24 frames per second (fps), 30 fps, 60 fps, 120 fps, or the like. The camera per frame exposure time may be between 100 microseconds and 300 microseconds. In other embodiments, the camera per frame exposure time may be less than 100 microseconds. In still other embodiments, the camera per frame exposure time may be greater than 300 microseconds. The status/control interface 120 also provides ambient illumination information from the camera system 106 to the control device 104. The ambient illumination information is based on camera images captured during non-illumination cycle times. The camera images may each have a pixel resolution of 1280× 720, 1920×1080, 3840×2160, 7680×4320, or the like.

The control device 104 also provides a status/control interface 122 for coupling to a vehicle navigation system. The camera system 106 may provide the ambient illumination information and/or the camera images from the camera system 106 to the vehicle navigation system via the status/control interface 122. In some embodiments, the status/control interface 122 may be an Ethernet interface. For example, the Ethernet interface may be GigE, Dual GigE, 5GigE, 10 GigE, or the like. In other embodiments, the status/control interface 122 may be a Camera Link HS interface, a CoaXPress® interface, a Universal Serial Bus (USB) 3.0 interface, or the like.

The control device 104 may be any computing device (e.g. microcontroller) suitable for the semi-autonomous vehicle. The control device 102 may also be an application-specific integrated circuit (ASIC), a field-programmable gate array (FPGA), discrete logic/circuitry, or a combination thereof. In some embodiments, the control device 104 may be implemented within the vehicle navigation system. In other embodiments, the control device 104 may be implemented within the camera system 106, the navigation illumination source 108, and/or the driver illumination source 110.

Figure 2:
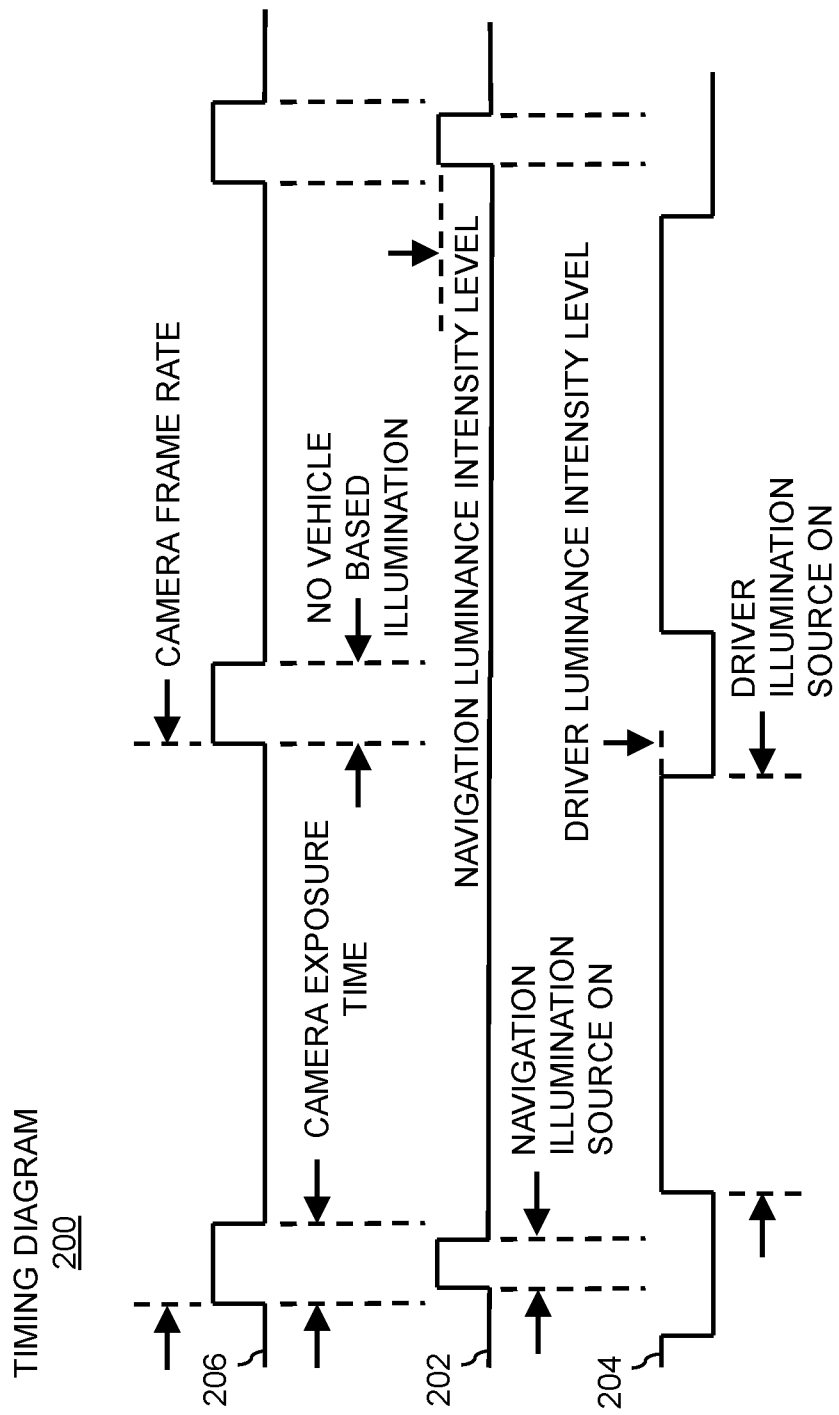
FIG. 2 depicts a timing diagram illustrating control signals provided for a camera system and two illumination sources in accordance with embodiments of the present disclosure.

FIG. 2 depicts a timing diagram 200 illustrating control signals 202, 204, and 206 provided within the illumination system 102 of FIG. 1 in accordance with embodiments of the present disclosure. The control signal 202 is provided from the control device 104 to the navigation illumination source 108 via the status/control interface 116. The control signal 202 may be provided by a controlled current source or a controlled voltage source of the control device 104. The control signal 204 is provided from the control device 104 to the driver illumination source 110 via the status/control interface 118. The control signal 204 may be provided by a controlled current source or a controlled voltage source of the control device 104. The control signal 206 is provided from the control device 104 to the camera system 106 via the status/control interface 120. The control signal 206 may be provided by a controlled current source or a controlled voltage source of the control device 104. In other embodiments the control signal 206 may be provided from the camera system 106 to the control device 104 via the status/control interface 120.

The control signal 202 provides both active cycle (i.e. the time between a rising edge and a falling edge of the waveform) for when the navigation illumination source 108 is on and a navigation luminance intensity level based on a voltage value or a current value. The control signal 204 provides both active cycle for when the driver illumination source 110 is on and a driver luminance intensity level based on a voltage value or a current value. The control signal 208 provides an indication for a camera exposure time and camera frame rate. The navigation illumination source 108 is cycled on and off, and the driver illumination source is cycled on and off such that one or more cameras of the camera system 106 can capture an image with no illumination and capture an image with just the navigation illumination source 108 on. The image with no illumination is used to determine ambient illumination information and the image with the navigation illumination source 108 on is used for obstacle detection. If the ambient illumination information indicates high ambient illumination levels at or near a possible obstacle a vehicle navigation system may determine the obstacle detection may be inaccurate. Or, if the ambient illumination information indicates overall illumination levels too high (e.g. approaching headlights) the vehicle navigation system may suspend obstacle detection until the overall illumination levels drop to an acceptable level to allow the navigation illumination source 108 to be effective. In some embodiments, one or more of the control signals 202, 204, and 206 may be derived from synchronization information received from the vehicle navigation system.

Figure 3:
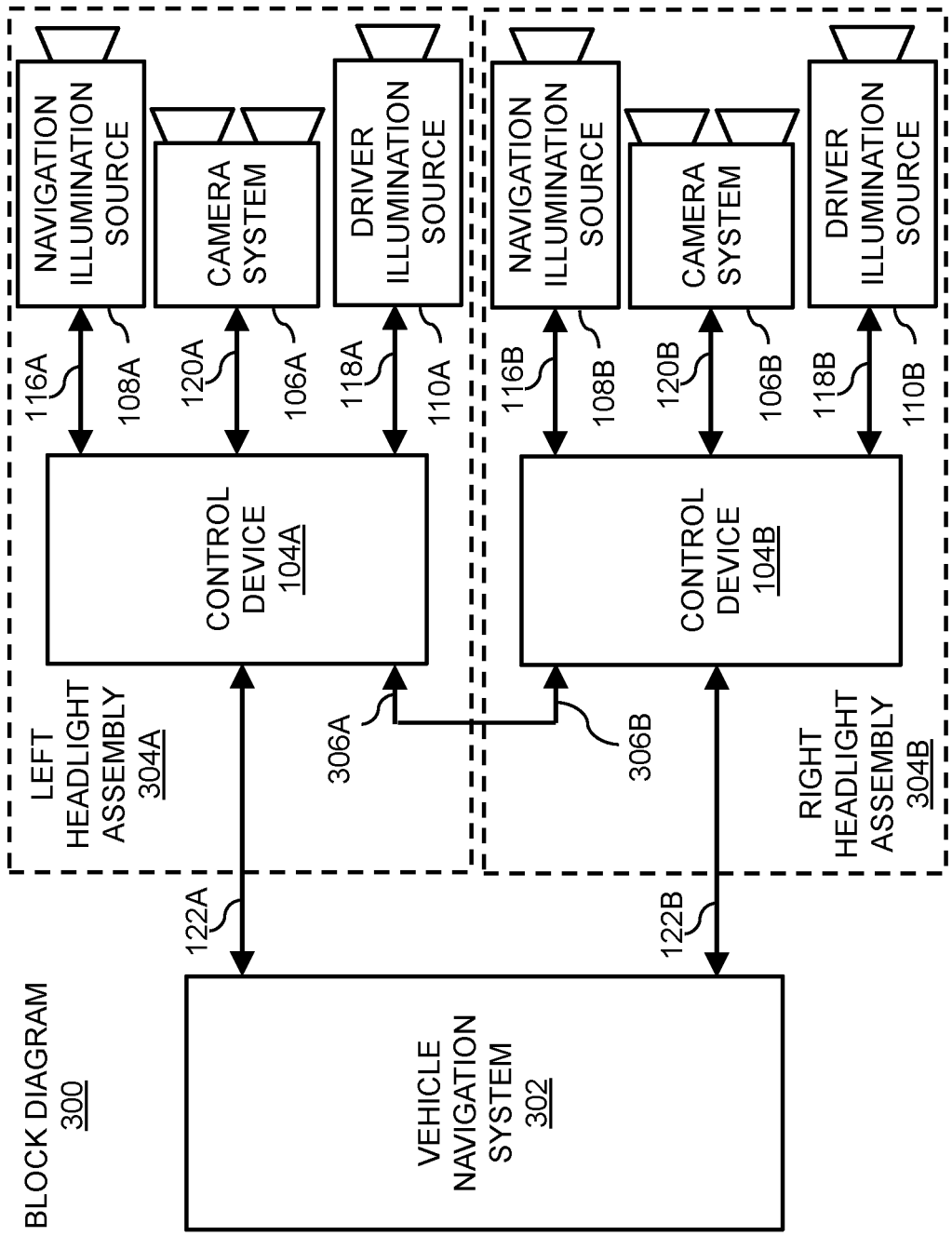
FIG. 3 depicts another block diagram illustrating another system for providing optimized simultaneous illumination for human vision and machine based navigation vision on a semi-autonomous vehicle in accordance with embodiments of the present disclosure.

FIG. 3 depicts another block diagram 300 illustrating another system for providing optimized simultaneous illumination for human vision and machine based navigation vision on a semi-autonomous vehicle in accordance with embodiments of the present disclosure. A vehicle navigation system 302 is coupled with a left headlight assembly 304A via a status/control interface 122A. The vehicle navigation system 302 is also coupled with a right headlight assembly 304B via a status/control interface 122B. The left headlight assembly 304A and the right headlight assembly 304B may each be dimensioned as a standardized headlight assembly for a given vehicle. The illumination system 102 of FIG. 1 is incorporated into the left head light assembly 304A and includes a control device 104A, a camera system 106A, a navigation illumination source 108A, a driver illumination source 110A, and status/control interfaces 116A, 118A, and 120A. The illumination system 102 of FIG. 1 is also incorporated into the right head light assembly 304B and includes a control device 104B, a camera system 106B, a navigation illumination source 108B, a driver illumination source 110B, and status/control interfaces 116B, 118B, and 120B. Synchronization interfaces 306A and 306B may also be used to provide one or more precise timing control signals between control devices 104A and 104B.

Figure 4:
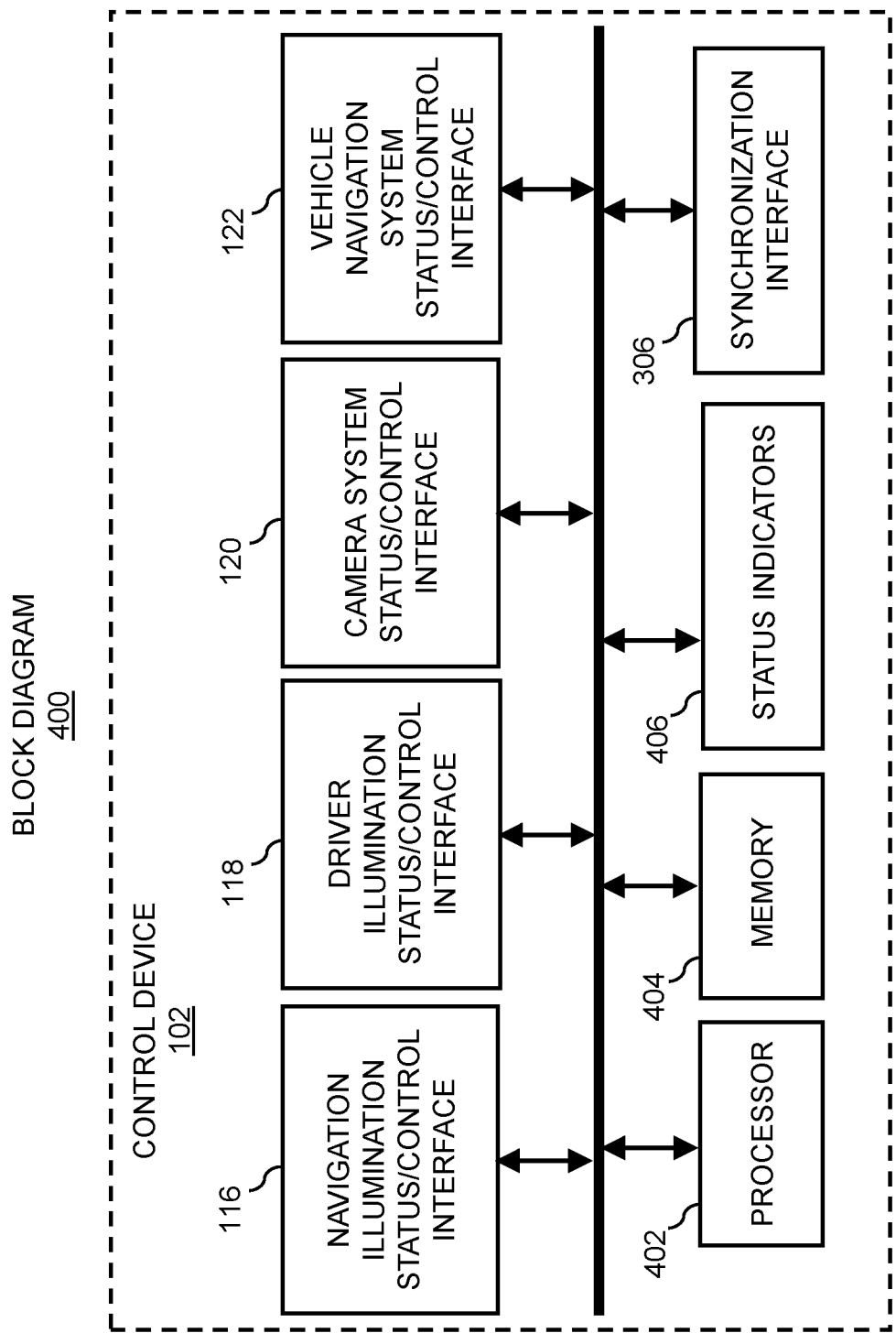
FIG. 4 depicts a block diagram illustrating a control device suitable for the system of FIG. 1 and/or the system of FIG. 2 in accordance with embodiments of the present disclosure.

FIG. 4 depicts a block diagram 400 illustrating one embodiment of the control device 102 of FIG. 1 and FIG. 3 for implementing the previously disclosed methods of simultaneous illumination supporting machine vision (e.g. autonomous navigation) and human vision (e.g. vehicle driver) within semi-autonomous vehicles. The control device 102 includes a processor 402 and a memory 404. In certain embodiments the microprocessor may be an 8-bit, a 16-bit, a 32-bit, or a 64-bit architecture processor. The memory 404 may include a combination of volatile memory (e.g. random access memory) and non-volatile memory (e.g. flash memory). In certain embodiments, the memory 404 may be integrated with the processor 402. In some embodiments the control device 102 may be integrated at least partially within a microcontroller. The microcontroller may include timers, signal generators, parallel input/output (I/O), and serial I/O. Additionally the microcontroller may include analog-to-digital converters and digital-to-analog converters.

The control device 102 includes status indicators 406. The status indicators may include one or more light emitting diodes (LEDs) that indicate power, correct operation, and/or a failed state. The control device 102 also included the navigation illumination status/control interface 116, the driver illumination status/control interface 118, the camera system status/control interface 120; the vehicle navigation system status/control interface 122, and the synchronization interface 306 previously disclosed in the systems of FIG. 1 and FIG. 3. In certain embodiments, one or more of these interfaces may be configure to connect with a controller area network (CAN).

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed invention. When implemented on a general-purpose processor, the program code combines with the processor to provide a unique apparatus that operates to perform the processing of the presently disclosed invention.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A vehicle headlight assembly for providing illumination for machine vision and illumination for human vision for semi-autonomous driving, the vehicle headlight assembly comprising:
   a first illumination source is configured to provide a first frequency band of illumination for a camera system based on first active cycle times; and
   a second illumination source is configured to provide a second frequency band of illumination for a human based on second active cycle times, wherein the camera system is configured to:
      detect ambient images during non-illumination cycle times of the first illumination source and the second illumination source based on the first active cycle times and the second active cycle times; and
      detect navigation images during the first active cycle times of the first illumination source.

2. The vehicle headlight assembly of claim 1, wherein the vehicle headlight assembly is a standardized vehicle headlight assembly.

3. The vehicle headlight assembly of claim 1, wherein the camera system is housed within the vehicle headlight assembly.

4. The vehicle headlight assembly of claim 3 further comprising a first computing device, wherein the first computing device is configured to provide a first control output for generating the first active cycle times, a second control output for generating the second active cycle times.

5. The vehicle headlight assembly of claim 4, wherein the first computing device is configured to:
   receive synchronization information from a vehicle management system; and
   provide non-illumination cycle times, the first active cycles times, and the second active cycle times based on the synchronization information.

6. The vehicle headlight assembly of claim 1, wherein the first frequency band of illumination and the second frequency band of illumination are mutually exclusive.

7. The vehicle headlight assembly of claim 1, wherein the vehicle headlight assembly is further configured to receive first intensity level information for the first illumination source.

8. The vehicle headlight assembly of claim 7, wherein, the vehicle headlight assembly is further configured to receive second intensity level information for the second illumination source.

9. The vehicle headlight assembly of claim 1, wherein the first illumination source includes a first light-emitting-diode (LED) array and the second illumination source includes a second LED array.

10. The vehicle headlight assembly of claim 4, wherein the first computing device is further configured to provide first camera timing information to the camera system.

11. The vehicle headlight assembly of claim 10, wherein the first camera timing information comprises a first camera frame rate and a first camera per frame exposure time.

12. The vehicle headlight assembly of claim 11, wherein the first camera frame rate is approximately 24 frames per second (fps), 30 fps, 60 fps, or 120 fps.

13. The vehicle headlight assembly of claim 11, wherein the first camera per frame exposure time is between 100 microseconds and 300 microseconds.

14. The vehicle headlight assembly of claim 11, wherein the first camera per frame exposure time is less than 100 microseconds.

15. The vehicle headlight assembly of claim 11, wherein the first camera per frame exposure time is greater than 300 microseconds.

16. The vehicle headlight assembly of claim 1, wherein the first illumination source is further configured to provide the first frequency band of illumination during active exposure intervals of the camera system.

17. The vehicle headlight assembly of claim 16, wherein the second illumination source is further configured to provide the second frequency band of illumination during non-active exposure intervals of the camera system.

18. The vehicle headlight assembly of claim 1, wherein the first frequency band of illumination is centered in a range between 820 nanometers and 880 nanometers and the second frequency band of illumination is centered in a range between 380 nanometers and 740 nanometers.

19. The vehicle headlight assembly of claim 4, wherein the first control output is further configured to vary the first frequency band of illumination and the second control output is further configured to vary the second frequency band of illumination.

20. The vehicle headlight assembly of claim 1, wherein the first illumination source is further configured to provide a first lumen level between 3500 lumens and 7500 lumens and the second illumination source is further configured to provide a second lumen level between 3500 lumens and 7500 lumens.

* * * * *